3,212,912
METHOD FOR THE PRESERVATIVE DRYING OF FOLIAGE
John E. Jones, Midland, Mich., assignor to The Dow Chemical Company, Midland, Mich., a corporation of Delaware
No Drawing. Filed May 31, 1962, Ser. No. 198,733
7 Claims. (Cl. 117—3)

This invention concerns a method for the preservation of foliage by drying. More particularly, the invention concerns a method which employs ion exchange resins as desiccants to preservatively dry foliage such as flowers, leaves, weeds and seed pods.

Dried foliage is mainly utilized for decorative purposes and consequently the physical appearance of the preserved product is of primary importance. Retention of original coloration, size and structural form are major problems which have, in general, been unsatisfactorily solved by the prior art methods. Other problems frequently encountered in the known methods include slow drying rates, incomplete drying and difficulty in regeneration of the desiccant for economical reuse. In addition, complete removal of minute, solid, desiccant particles without damaging the fragile dried foliage is generally arduous if not impossible and the relatively rough, hard conventional desiccant particles often damage the delicate epidermal plant tissues.

A method has now been discovered, in accordance with the present invention, which utilizes substantially anhydrous ion exchange resins as desiccants for the preservative drying of freshly cut foliage. Advantageous and highly desirable features which characterize the present invention include efficient drying at relatively rapid rates, minimal foliage structural deformation and damage, excellent retention of most original foliage coloration, complete and facile removal of the desiccant surrounding the dried foliage and regeneration of the desiccant for economical re-use by simple heating at moderate temperatures.

In the method of this invention freshly cut foliage is carefully and completely surrounded by a substantially anhydrous ion exchange resin, preferably within a container which is capable of being closed with an air tight seal. Intimate contact of desiccant and foliage is advantageous in preserving the original foliage structure. The contents are maintained at normal room temperature for a period of time, determined by the degree of succulence of the foliage, sufficient to effect satisfactory drying. Upon completion of drying the desiccant is simply and completely removed by decanting the resin. Although it is preferable to maintain the ion exchange resin and foliage within a sealed container during the drying period in order to avoid resin adsorption of moisture from the atmosphere, this is not an essential requirement. The use of a sealed container, however, minimizes the amount of desiccant necessary to effect foliage drying.

The substantially anhydrous ion exchange resin desiccant is preferably employed in the form of spheroidal bead-like particles of about 20 to 150 mesh in the U.S. Standard Sieve Series. This spheroidal particle shape is particularly advantageous since it reduces the damage to the foliage structures which frequently results in prior art methods which generally employ edged, granular particles. In addition, the ion exchange resins employed have a low density which also reduces foliage structural damage.

A variety of ion exchange resins, advantageously in a salt form such as the sodium and potassium salts of polymeric styrene sulfonates, the polymeric (vinylbenzyl) trialkylammonium chloride and bromide and the like, are suitable for use in the method of the present invention. Strongly basic anion exchange resins which incorporate a quaternary ammonium type of structure and acidic cation exhcange resins of the carboxylic acid type may be employed in a substantially anhydrous state. Substantially anhydrous cation exchange resins prepared by sulfonation of conventional polymeric alkenylaromatic resins cross-linked with a polyvinyl cross-linking agent copolymerizable therewith are especially efficacious. Examples of these ion exchange resins are the partially and completely sulfonated polymers of styrene, arylvinyltoluenes, arylvinylxylenes, vinylnaphthalenes, arylvinylethylbenzenes, $\alpha$-methylstyrene, vinylchlorobenzenes, vinyldichlorobenzenes or mixtures thereof cross-linked with cross-linking agents such as divinylbenzenes, divinyltoluenes, divinylxylenes, divinylnaphthalenes, divinylethylbenzenes, etc. A preferred ion exchange resin desiccant for use in the practice of this invention is the substantially anhydrous potassium form of a partially and non-uniformly sulfonated, copolymer resin of styrene and divinylbenzene. This resin may be prepared by employing an amount of chlorosulfonic sulfonating agent which is sufficient to sulfonate from about 5 to 65 percent of the available aromatic nuclei in a styrene polymer, cross-linked with from about 0.1 to 24 percent divinylbenzene, in spheroidal bead form. The polymer is swollen with methylene chloride prior to sulfonation at a temperature of from about 0° to 100° C. The partially sulfonated final product, characterized by a sulfonated polymer shell surrounding a non-sulfonated polymer core of substantial size, is especially resistant to osmotic shock conditions which cause cracking, spallation and shattering of conventional, uniformly sulfonated resins. This resin is especially advantageous due to the ease and safety with which it may be regenerated for reuse. For example, a sample of resin which contained about 4.8 percent by weight of moisture, after having been used for drying foliage, was dried to 1.8 percent by weight moisture by distributing the resin in a uniformly shallow layer and placing it in an oven at a temperature of 115° C. for four hours. Flash and fire tests demonstrated safety in handling at temperatures above 600° C. A temperature of about 110° to 150° C. is preferred for regeneration. The ion exchange resin desiccant is usable for drying most foliage when the moisture content of the resin is less than about three weight percent, resin basis.

In order to facilitate determination of the necessity for regeneration, a portion of the ion exchange resin may be exchanged with cobaltous chloride. A blue coloration indicates that the ion exchange resin is sufficiently dry for use while a red coloration indicates increased moisture content and correspondingly decreased desiccant efficiency.

The length of time required for drying foliage to substantially constant weight is determined by the physical characteristics of the foliage. In general a period of 1 to 5 days is required. One day is a sufficient period of time to dry most weeds, such as wild chicory, sow thistle, wild carrot and dandelion. A two day drying period is employed for most flowers if the calyx is small and the petals are thin and well opened. Examples of these include bachelor buttons, roses, gaillardia, cosmos, golden glow, asters and pansies. The more succulent types of flowers such as orchids and tiger lilies require approximately four days for drying.

Experiments demonstrated especially advantageous results when sulfonated cation exchange resins of polystyrene, cross-linked with from about 0.1 to 24 percent of divinylbenzene, were employed in the method of the present invention. Both the conventional, uniformly sulfonated resins and the partially and non-uniformly sulfonated resins and their salts, e.g. the sodium and potassium salts, were utilized in these experiments. Freshly cut foliage was placed in a container having a bottom layer of resin, in spheroidal bead form, approximately two inches deep. The foliage was then carefully and completely surrounded with additional resin beads and the container capped to provide an essentially airtight seal. The resin was carefully decanted after a time sufficient to dry the foliage as discussed in the previous paragraph. These experiments demonstrated excellent retention of original structural form and coloration of the foliage. Examples of these dried products having an exceptionally pleasing decorative appearance include, in addition to those listed in the preceding paragraph, Belles of Ireland, snapdragons, iris, daffodils, carnations and chrysanthemums. Similar experiments were conducted in which other desiccants were employed for purposes of comparison. The method of the present invention uniformly resulted in a dried foliage product having structural and coloration retention equal, and in many cases superior, to those foliage products dried by previously known methods employing desiccants such as borax, dry sand, corn meal and silica gel. A major advantage of the present invention, previously referred to, is an improved appearance of the dried product due to the absence of powdery residues such as often result when desiccants such as silica gel are employed. This powdery residue, which is oftentimes difficult to remove without damaging the fragile dried foliage, is advantageously obviated by the use of spheroidal bead ion exchange resin desiccants, in the method of the present invention, which are easily removed and furnish an additional advantage in that the smooth bead surfaces cause less abrasion of the delicate epidermal plant tissues than do the rough-edged particles generally employed in the previously known methods.

I claim:
1. A method for the preservative drying of foliage which comprises placing freshly cut foliage in contiguity with particles of a substantially dry anhydrous ion exchange resin selected from the group consisting of sulfonated cation exchange resins, carboxylated cation exchange resins and strongly basic anion exchange resins, for a period of time sufficient to dry said foliage, said particles having a size predominantly within the range of 20 to 150 mesh.
2. The method of claim 1, wherein the substantially anhydrous ion exchange resin is a sulfonated cation exchange resin.
3. The method of claim 1, wherein the substantially anhydrous ion exchange resin is a partially and non-uniformly sulfonated cation exchange resin.
4. The method of claim 1, wherein the substantially anhydrous ion exchange resin is a sulfonated alkenylaromatic polymer cross-linked with a polyvinyl cross-linking agent copolymerizable therewith.
5. The method of claim 1, wherein the substantially anhydrous ion exchange resin is employed in the form of spheroidal bead-like particles.
6. The method of claim 1, wherein the substantially anhydrous ion exchange resin is a sulfonated copolymer of styrene and divinylbenzene.
7. The method of claim 1, wherein the substantially anhydrous ion exchange resin is a sulfonated cation exchange resin having a minor portion of its sulfonated sites containing cobaltous ions.

References Cited by the Examiner

UNITED STATES PATENTS

| | | | |
|---|---|---|---|
| 1,588,164 | 6/26 | Brunner et al. | 117—3 |
| 2,042,974 | 6/36 | Weissflog | 117—3 |
| 2,105,688 | 1/38 | Fessenden | 34—9 |
| 2,300,495 | 11/42 | Gerhart | 117—3 |
| 2,567,929 | 9/51 | Fessenden | 117—3 |
| 2,658,836 | 11/53 | Fessenden | 117—3 |
| 2,698,809 | 1/55 | Fessenden | 117—3 |
| 2,805,137 | 9/57 | Clopton | 117—3 |
| 2,923,095 | 2/60 | Magimel-Pelonnier et al. | 117—3 |
| 3,030,317 | 4/62 | Hatch | 260—2.2 |
| 3,030,318 | 4/62 | Kressman | 260—2.2 |
| 3,067,161 | 12/62 | Roth | 166—9 |

FOREIGN PATENTS 520,666   4/40   Great Britain.

OTHER REFERENCES

Publication: Encyclopedia of Chemical Technology (1952, volume 8, page 13).

PERCY L. PATRICK, *Primary Examiner.*

NORMAN YUDKOFF, *Examiner.*